(12) United States Patent
Liao et al.

(10) Patent No.: US 11,023,197 B2
(45) Date of Patent: Jun. 1, 2021

(54) METHOD AND APPARATUS FOR MIRRORING SCREEN

(71) Applicant: BEIJING XIAOMI MOBILE SOFTWARE CO., LTD., Beijing (CN)

(72) Inventors: Yijing Liao, Beijing (CN); Xingliang Tao, Beijing (CN); Ming Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,615

(22) Filed: Nov. 30, 2019

(65) Prior Publication Data

US 2021/0064324 A1   Mar. 4, 2021

(30) Foreign Application Priority Data

Aug. 28, 2019   (CN) .......................... 201910800884.1

(51) Int. Cl.
  *G09G 5/00*   (2006.01)
  *G06F 3/14*   (2006.01)
  *H04W 76/10*   (2018.01)

(52) U.S. Cl.
  CPC .......... *G06F 3/1454* (2013.01); *G06F 3/1462* (2013.01); *H04W 76/10* (2018.02); *G09G 2370/16* (2013.01)

(58) Field of Classification Search
  CPC .......... G06F 3/14; G06F 3/1462; G06F 3/041; G06F 3/0482; G06F 3/04817; G06F 3/1454; H04N 21/816; H04N 21/4126; H04N 21/4223; H04N 21/4363; H04N 21/2353

USPC ................................................... 345/2.2, 713
See application file for complete search history.

(56) References Cited

U.S. PATENT DOCUMENTS

| | | | |
|---|---|---|---|
| 2016/0216852 A1* | 7/2016 | Lee | H04N 21/8173 |
| 2017/0060518 A1* | 3/2017 | Hong | H04L 63/0861 |
| 2018/0234494 A1* | 8/2018 | Klemets | H04L 12/12 |
| 2020/0053417 A1* | 2/2020 | Choi | H04N 21/41407 |

FOREIGN PATENT DOCUMENTS

| | | |
|---|---|---|
| KR | 20180080980 A | 7/2018 |
| WO | 2016192200 A1 | 12/2016 |

OTHER PUBLICATIONS

European Patent Office, Extended European Search Report Issued in Application No. 19214029.1, dated May 7, 2020, Germany, 11 pages.

* cited by examiner

*Primary Examiner* — Jennifer T Nguyen
(74) *Attorney, Agent, or Firm* — Syncoda LLC; Feng Ma

(57) ABSTRACT

A method for minoring screen includes: determining a target receiver device to be screen-mirrored, where the target receiver device is a screen-mirrorable device supporting a second wireless communication manner; and sending a preset instruction to the target receiver device in a first wireless communication manner, where the preset instruction is used to instruct the target receiver device to establish a minor connection with the transmitter device in the second wireless communication manner.

15 Claims, 14 Drawing Sheets

METHOD AND APPARATUS FOR MIRRORING SCREEN

CROSS-REFERENCE TO RELATED APPLICATION

This application claims priority to Chinese Patent Application No. 201910800884.1 filed on Aug. 28, 2019, the disclosure of which is hereby incorporated by reference in its entirety.

BACKGROUND

A transmitter device may adopt a screen mirroring manner supported by both itself and a receiver device to mirror contents from the transmitter to the receiver device such as a TV. By taking a Miracast screen mirroring manner as an example, the transmitter device functions as a hot spot and the receiver device cannot be connected with another network such as a TV network after being connected with the transmitter device.

SUMMARY

The present disclosure relates generally to the fields of communications, and more specifically to a method and an apparatus for mirroring screen.

According to a first aspect of an example of the present disclosure, there is provided a method of mirroring screen. The method may be applied to a transmitter device and include:

determining a target receiver device to be screen-mirrored, where the target receiver device is a screen-mirrorable device supporting a second wireless communication manner; and sending a preset instruction to the target receiver device in a first wireless communication manner, where the preset instruction is used to instruct the target receiver device to establish a minor connection with the transmitter device in the second wireless communication manner.

According to a second aspect of an example of the present disclosure, there is provided a method of mirroring screen. The method is applied to a receiver device and includes:

receiving a preset instruction sent by a transmitter device in a first wireless communication manner; and establishing a minor connection with the transmitter device in a second wireless communication manner based on the preset instruction;

synchronously displaying contents of a screen of the transmitter device after establishing the mirror connection with the transmitter device.

According to a third aspect of the present disclosure, there is provided an apparatus for mirroring screen. The apparatus may be applied to a transmitter device and include:

a determining module, configured to determine a target receiver device to be screen-mirrored, where the target receiver device is a screen-mirrorable device supporting a second wireless communication manner; and a first sending module, configured to send a preset instruction to the target receiver device in a first wireless communication manner, where the preset instruction is used to instruct the target receiver device to establish a mirror connection with the transmitter device in the second wireless communication manner.

According to a fourth aspect of an example of the present disclosure, there is provided an apparatus for minoring screen. The apparatus may be applied to a receiver device and include:

a receiving module, configured to receive a preset instruction sent by a transmitter device in a first wireless communication manner;

a connection establishing module, configured to establish a minor connection with the transmitter device in a second wireless communication manner based on the preset instruction; and a displaying module, configured to synchronously display contents of a screen of the transmitter device after the mirror connection with the transmitter device is established.

According to a fifth aspect of an example of the present disclosure, there is provided a computer readable storage medium storing computer program. The computer programs are configured to perform the method of mirroring screen according to the above first aspect.

According to a sixth aspect of an example of the present disclosure, there is provided a computer readable storage medium storing computer program. The computer programs are configured to perform the method of mirroring screen according to the above second aspect.

According to a seventh aspect of an example of the present disclosure, there is provided an apparatus for mirroring screen. The apparatus may be applied to a transmitter device and include:

a processor; and
a memory storing processor-executable instructions.
The processor is configured to:

determine a target receiver device to be screen-mirrored, where the target receiver device is a screen-mirrorable device supporting a second wireless communication manner; and send a preset instruction to the target receiver device in a first wireless communication manner, where the preset instruction is used to instruct the target receiver device to establish a mirror connection with the transmitter device in the second wireless communication manner.

According to an eighth aspect of an example of the present disclosure, there is provided an apparatus for mirroring screen. The apparatus may be applied to receiver device and include:

a processor; and
a memory storing processor-executable instructions.
The processor is configured to:

receive a preset instruction sent by a transmitter device in a first wireless communication manner;

establish a mirror connection with the transmitter device in a second wireless communication manner based on the preset instruction;

after the mirror connection with the transmitter device is established, synchronously display contents of a screen of the transmitter device.

It shall be understood that the above general descriptions and subsequent detailed descriptions are merely illustrative and explanatory and shall not be intended to limit the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1:
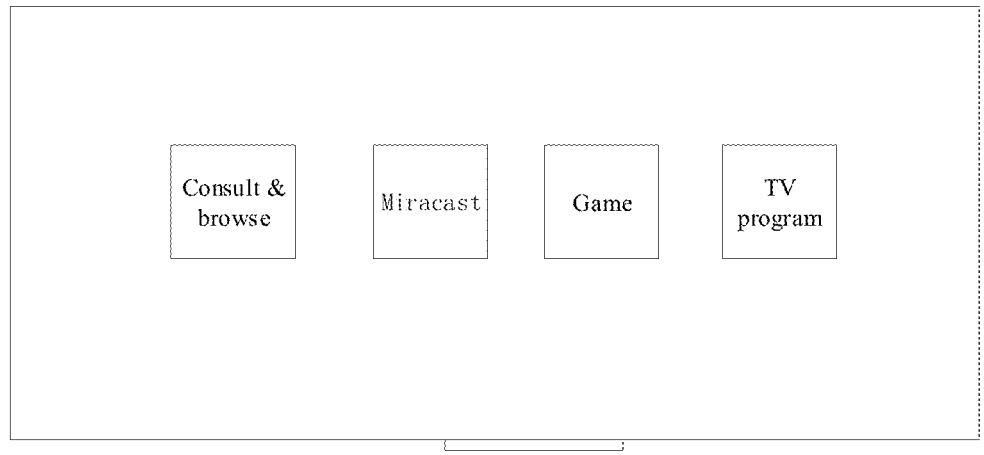
FIG. 1 is a schematic diagram illustrating a scenario where a Miracast function is enabled according to an example of the present disclosure.

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a," "said," and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, this information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

FIG. 1 is a schematic diagram illustrating a scenario where a Miracast function is enabled according to an example of the present disclosure. For the receiver device, a Miracast function is generally in a closed state. If desiring to perform screen mirroring in the Miracast screen mirroring manner, a user typically needs to control a remote controller manually to enable the Miracast function as shown in FIG. 1.

Figure 2:
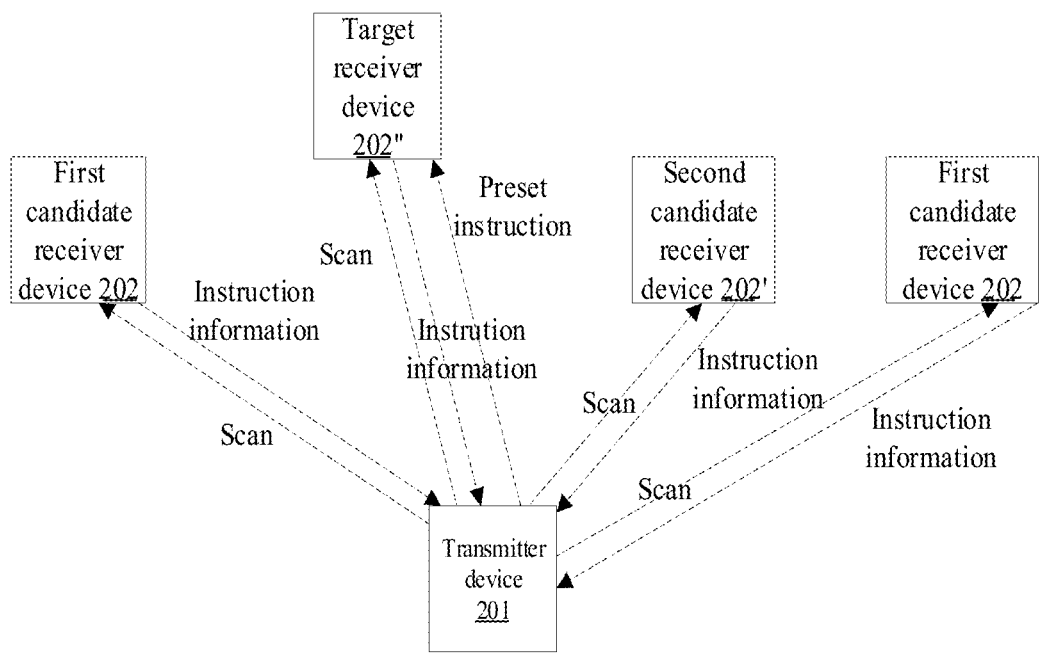
FIG. 2 is a schematic diagram illustrating a scenario of mirroring screen according to an example of the present disclosure.

FIG. 2 is a schematic diagram illustrating a scenario of mirroring screen according to an example of the present disclosure. A transmitter device 201 and first candidate receiver devices 202 enable a function of supporting a first wireless communication manner. Further, the transmitter device 202 and the first candidate receiver devices 202 agree by a protocol in advance that the transmitter device 201 may scan and find one or more first candidate receiver devices 202 that enable the function of supporting the first wireless communication manner and are available for screen mirroring.

After finding the one or more first candidate receiver devices 202 in the first wireless communication manner, the transmitter device 201 may determine one or more second candidate receiver devices 202' supporting a second wireless communication manner from the one or more first candidate receiver devices 202. Further, the transmitter device 201 determines a target receiver device 202" to be screen-mirrored in the one or more second candidate receiver devices 202'.

The transmitter device 201 sends a preset instruction to the target receiver device 202" in the first wireless communication manner. The target receiver device 202" establishes a mirror connection with the transmitter device 201 in the second wireless communication manner based on the preset instruction and synchronously displays contents of a screen of the transmitter device 201.

In the above example, a user is not required to manually enable the second wireless communication function on the receiver device nor put the transmitter device and the receiver device in the same local area network, thereby simplifying user operation and increasing availability of the screen mirroring manner.

The method of mirroring screen according to an example of the present disclosure will be firstly described below from the transmitter device side.

Figure 3:
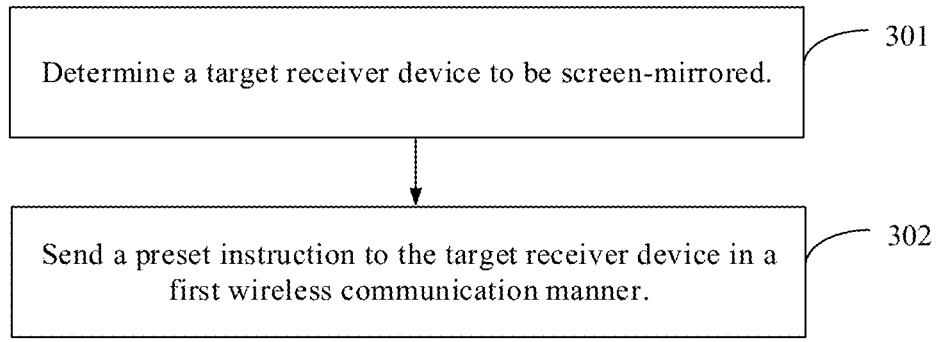
FIG. 3 is a flowchart illustrating a method of mirroring screen according to an example of the present disclosure.

An example of the present disclosure provides a method of mirroring screen, which may be applied to a transmitter device. Optionally, the transmitter device may be a handheld device such as a mobile phone, a laptop computer, and an ipad. FIG. 3 is a flowchart illustrating a method of mirroring screen according to an example of the present disclosure. The method may include the following blocks.

At block 301, a target receiver device to be screen-mirrored is determined.

In an example of the present disclosure, the target receiver device is a screen-mirrorable (supporting screen mirroring and available for screen mirroring) device supporting a second wireless communication manner. The second wireless communication manner is a wireless communication manner, for example, a Miracast communication manner, in which the transmitter device is taken as a hotspot to perform wireless communication with the receiver device. The screen-mirrorable device may be a TV and so on.

At block 302, a preset instruction is sent to the target receiver device in a first wireless communication manner.

The first wireless communication manner is a Bluetooth communication manner. The transmitter device may enable the Bluetooth communication function in advance. The preset instruction is used to instruct the target receiver device to establish a mirror connection with the transmitter device in the second wireless communication manner, so that the target receiver device synchronously displays the contents of the screen of the transmitter device, realizing screen mirroring.

In the above example, a user is not required to manually enable the second wireless communication function nor put the transmitter device and the receiver device in the same local area network, thereby simplifying user operation and increasing availability of the screen mirroring manner.

Figure 4:
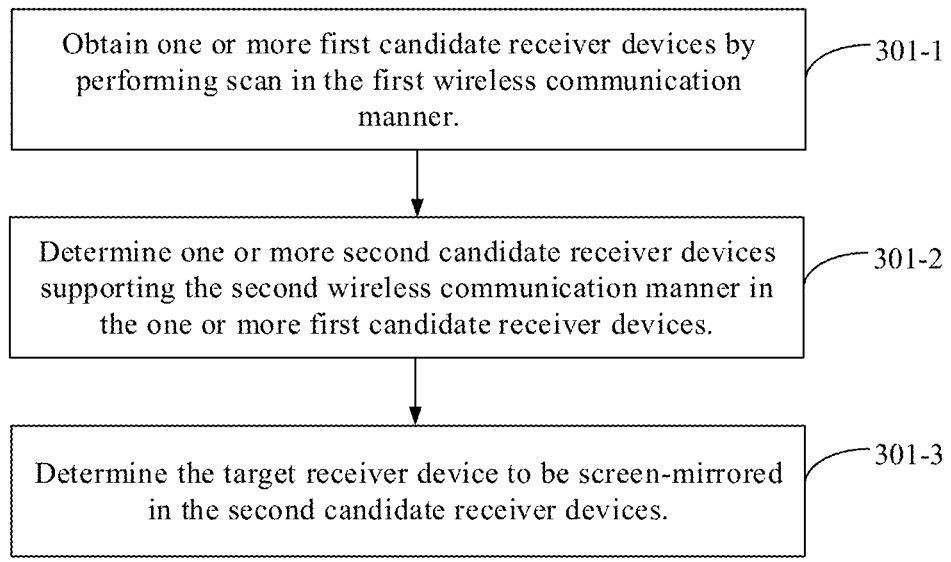
FIG. 4 is a flowchart illustrating another method of mirroring screen according to an example of the present disclosure.

FIG. 4 is a flowchart illustrating another method of mirroring screen based on the example of FIG. 3. As shown in FIG. 4, in an example, block 301 may include the following blocks.

At block 301-1, one or more first candidate receiver devices are obtained by performing scan in the first wireless communication manner.

The first candidate receiver devices are screen-mirrorable devices enabling the function of supporting the first wireless communication manner. The first wireless communication manner may be a Bluetooth communication manner. The transmitter device may enable the Bluetooth communication function in advance. Correspondingly, the first candidate receiver devices are screen-mirrorable devices enabling the function of supporting the Bluetooth communication.

Further, the transmitter device and the receiver devices agree by a protocol in advance that the transmitter device may find the first candidate receiver devices that enable the function of supporting the first wireless communication manner and are available for screen mirroring by performing scan in the first wireless communication manner.

Figure 5:
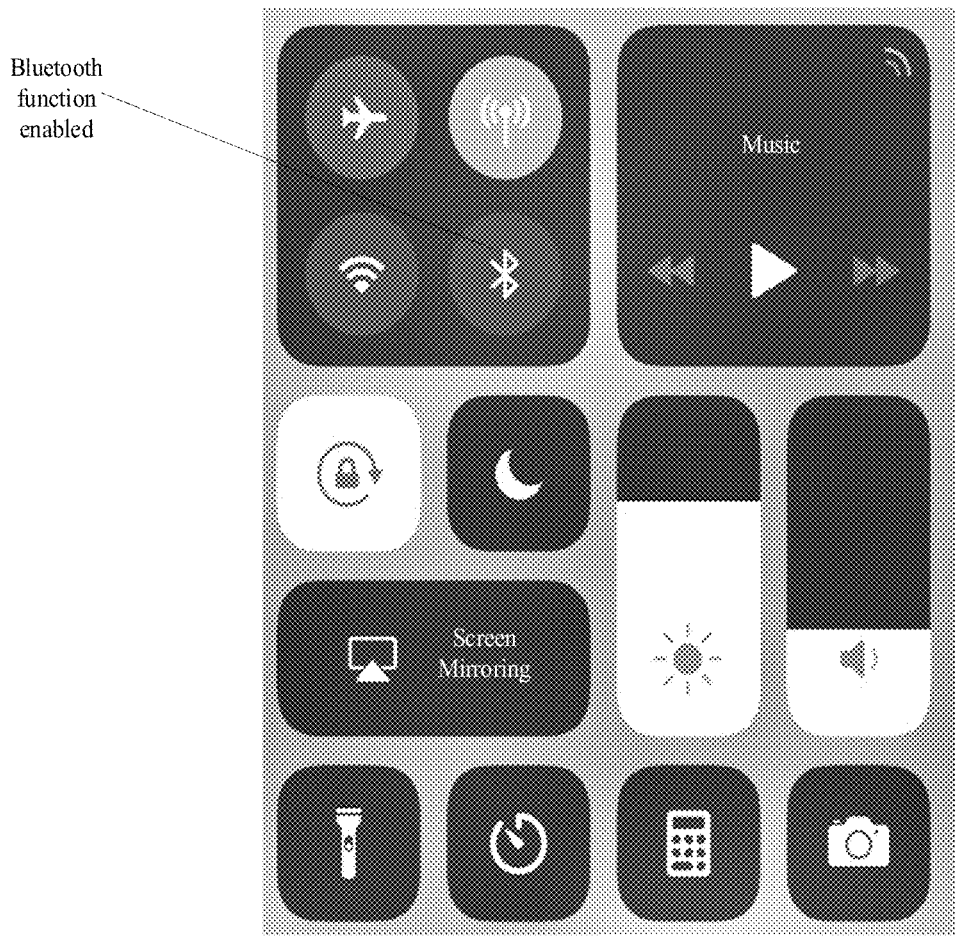
FIG. 5 is a schematic diagram illustrating another scenario of mirroring screen according to an example of the present disclosure.

At this block, the transmitter device may enable the function of supporting the first wireless communication manner in advance, that is, enable the function of supporting the Bluetooth communication as shown in FIG. 5. One or more first candidate receiver devices that also enable the function of supporting the Bluetooth communication and are available for screen mirroring are found by performing scan in the Bluetooth communication manner.

At block 301-2, one or more second candidate receiver devices supporting the second wireless communication manner are determined in the one or more first candidate receiver devices.

In an example of the present disclosure, the second wireless communication manner may be a wireless communication manner, for example, a Miracast communication manner, in which the transmitter device is taken as a hotspot to perform wireless communication with the receiver device. Correspondingly, the second candidate receiver devices are receiver devices supporting the Miracast communication manner in the first candidate receiver devices.

At block 301-3, the target receiver device to be screen-mirrored is determined in the one or more second candidate receiver devices.

In an example of the present disclosure, after the one or more second candidate receiver devices are determined, the target receiver device is determined from the second candidate receiver devices.

Figure 6:
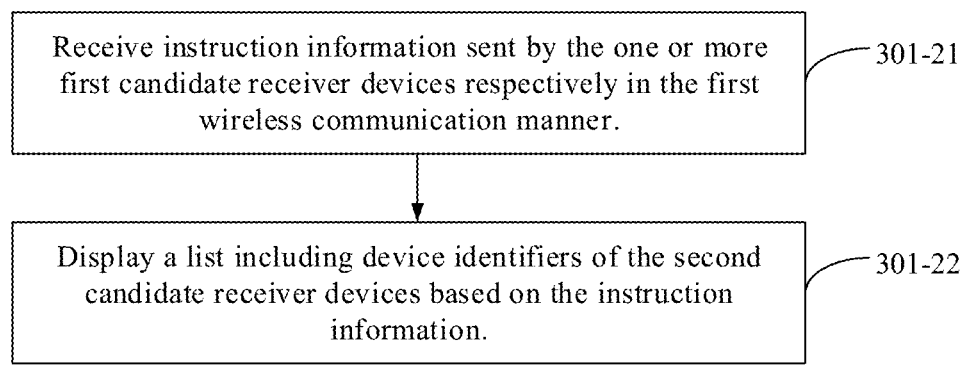
FIG. 6 is a flowchart illustrating another method of mirroring screen according to an example of the present disclosure.

FIG. 6 is a flowchart illustrating another method of mirroring screen based on the example of FIG. 3. As shown in FIG. 6, in an example, block 301-2 may include the following blocks.

At block 301-21, instruction information sent by the one or more first candidate receiver devices respectively is received in the first wireless communication manner.

At this block, after the transmitter device finds the first candidate receiver devices, each first candidate receiver device may send the instruction information to the transmitter device in the first wireless communication manner, i.e. the Bluetooth communication manner. Each of the first candidate receiver devices notifies the transmitter device of whether the corresponding first candidate receiver device supports the second wireless communication manner through the instruction information.

At block 301-22, a list including device identifiers of the second candidate receiver devices is displayed based on the instruction information.

Figure 7:
FIG. 7 is a schematic diagram illustrating another scenario of mirroring screen according to an example of the present disclosure.
Figure 8:
FIG. 8 is a schematic diagram illustrating another scenario of mirroring screen according to an example of the present disclosure.
Figure 9:
FIG. 9 is a schematic diagram illustrating another scenario of mirroring screen according to an example of the present disclosure.

After receiving the instruction information, the transmitter device may determine the second candidate receiver devices supporting the Miracast communication manner in the first candidate receiver devices. Further, the transmitter device displays the list including the device identifiers of the second candidate receiver devices as shown in FIGS. 7 and 8.

Correspondingly, the block 301-3 may specifically be described as follows.

In the device identifier list, the target receiver device to be screen-mirrored selected by a user is determined.

At this block, the user may select one device identifier in the device identifier list displayed by the transmitter device and take the corresponding receiver device as the target receiver device to be screen-mirrored.

In an example, at block 302, the transmitter device may send a preset instruction to the target receiver device in the first wireless communication manner to instruct the target receiver device to establish a mirror connection with the transmitter device in the second wireless communication manner. Thus, the target receiver device displays the contents of the screen of the transmitter device, thereby realizing screen mirroring.

In an example, optionally, the first wireless communication manner may be a Bluetooth communication manner, and the second wireless communication manner may be a wireless communication manner, for example, a Miracast communication manner, in which the transmitter device is taken as a hotspot to perform wireless communication with the receiver device.

In an example, the transmitter device may control in the Bluetooth communication manner the receiver device to switch to the Miracast screen mirroring manner. In this way, a user is not required to manually enable the second wireless communication function nor put the transmitter device and the receiver device in the same local area network, thereby simplifying user operation and increasing availability of the screen mirroring manner.

The method of mirroring screen according to the examples of the present disclosure will be described below from the receiver device side.

Figure 10:
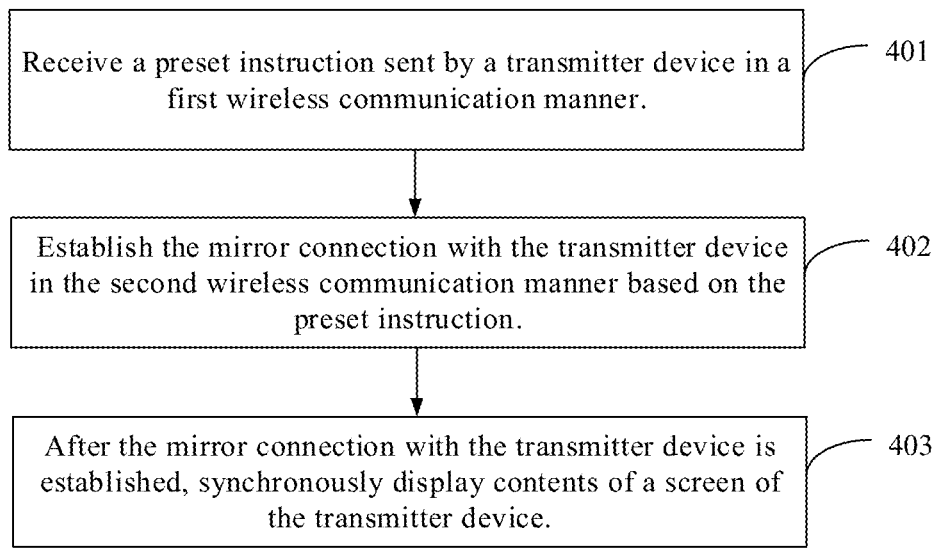
FIG. 10 is a flowchart illustrating another method of mirroring screen according to an example of the present disclosure.

An example of the present disclosure provides another method of mirroring screen, which may be applied in a receiver device. Optionally, the receiver device may be a screen-mirrorable device such as a TV. FIG. 10 is a flowchart illustrating another method of mirroring screen according to an example of the present disclosure. As shown in FIG. 10, the method includes the following blocks.

At block 401, a preset instruction sent by a transmitter device in a first wireless communication manner is received.

In an example of the present disclosure, the preset instruction is used to instruct the receiver device to establish a mirror connection with the transmitter device in a second wireless communication manner. Optionally, the receiver device may enable the function of supporting the first wireless communication manner in advance. The first wireless communication manner may be a Bluetooth communication manner and the second wireless communication manner may be a wireless communication manner, for example, a Miracast communication manner, in which the transmitter device is taken as a hotspot to perform wireless communication with the receiver device.

At block 402, the mirror connection with the transmitter device is established in the second wireless communication manner based on the preset instruction.

At block 403, after the mirror connection with the transmitter device is established, contents of a screen of the transmitter device are synchronously displayed.

In the above example, a user is not required to manually enable the second wireless communication function nor put the transmitter device and the receiver device in the same local area network, thereby simplifying user operation and increasing availability of the screen mirroring manner.

In an example, at the above block 401, since the transmitter device and the receiver device both enable the function of supporting the first wireless communication manner, the transmitter device may broadcast the preset instruction to the receiver device in the first wireless communication manner, for example, the Bluetooth communication manner, and the receiver device receives the preset instruction through Bluetooth.

Figure 11:
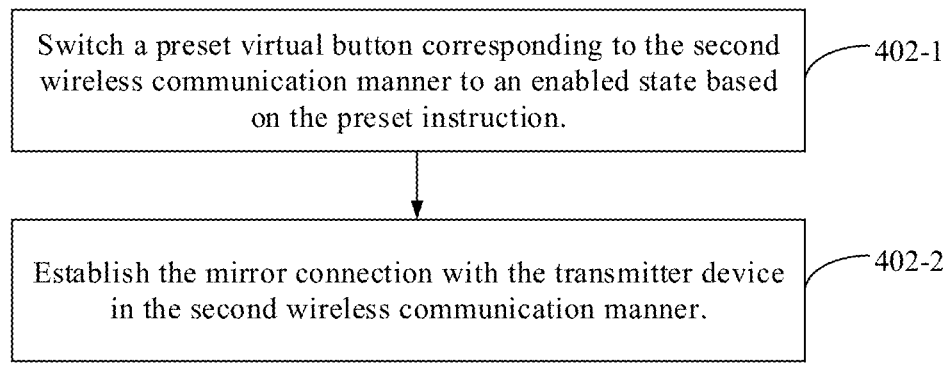
FIG. 11 is a flowchart illustrating another method of mirroring screen according to an example of the present disclosure.

FIG. 11 is a flowchart illustrating another method of mirroring screen based on the example of the FIG. 10. In an example, as shown in FIG. 11, the block 402 includes the following blocks.

At block 402-1, a preset virtual button corresponding to the second wireless communication manner is switched to an enabled state based on the preset instruction.

Figure 12:
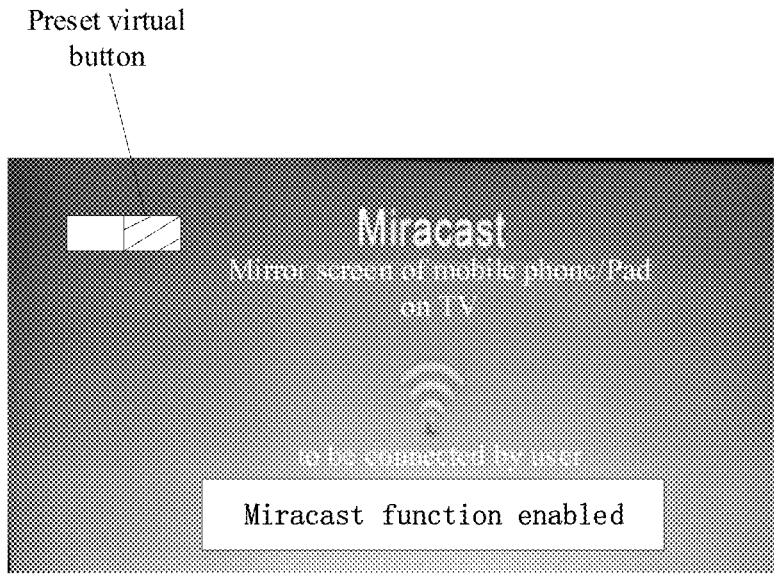
FIG. 12 is a schematic diagram illustrating another scenario of mirroring screen according to an example of the present disclosure.

At this block, the receiver device may switch the preset virtual button corresponding to the second wireless communication manner, for example, the Miracast, to an enabled state based on the preset instruction, as shown in FIG. 12.

At block 402-2, a mirror connection with the transmitter device is established in the second wireless communication manner.

In an example of the present disclosure, after the receiver device enables the preset virtual button corresponding to the Miracast, the transmitter device functions as a hotspot and sends its own hotspot information to the receiver device based on Wi-FI Direct communication standard so that the transmitter device establishes the mirror connection with the transmitter device directly. The WI-FI Direct communication standard allows devices in a wireless network to be mutually connected without using a wireless router. The hotspot information may include the identifier of the transmitter device, for example, a MAC address or a terminal identifier or the like. If an access password is set when the transmitter device is taken as the hotspot, the hotspot information may further include this access password.

The receiver device accesses the transmitter device based on the hotspot information sent by the transmitter device to establish a mirror connection with the transmitter device.

Figure 13A:
FIG. 13A is a first schematic diagram illustrating a scenario of mirroring screen according to an example of the present disclosure.
Figure 13B:
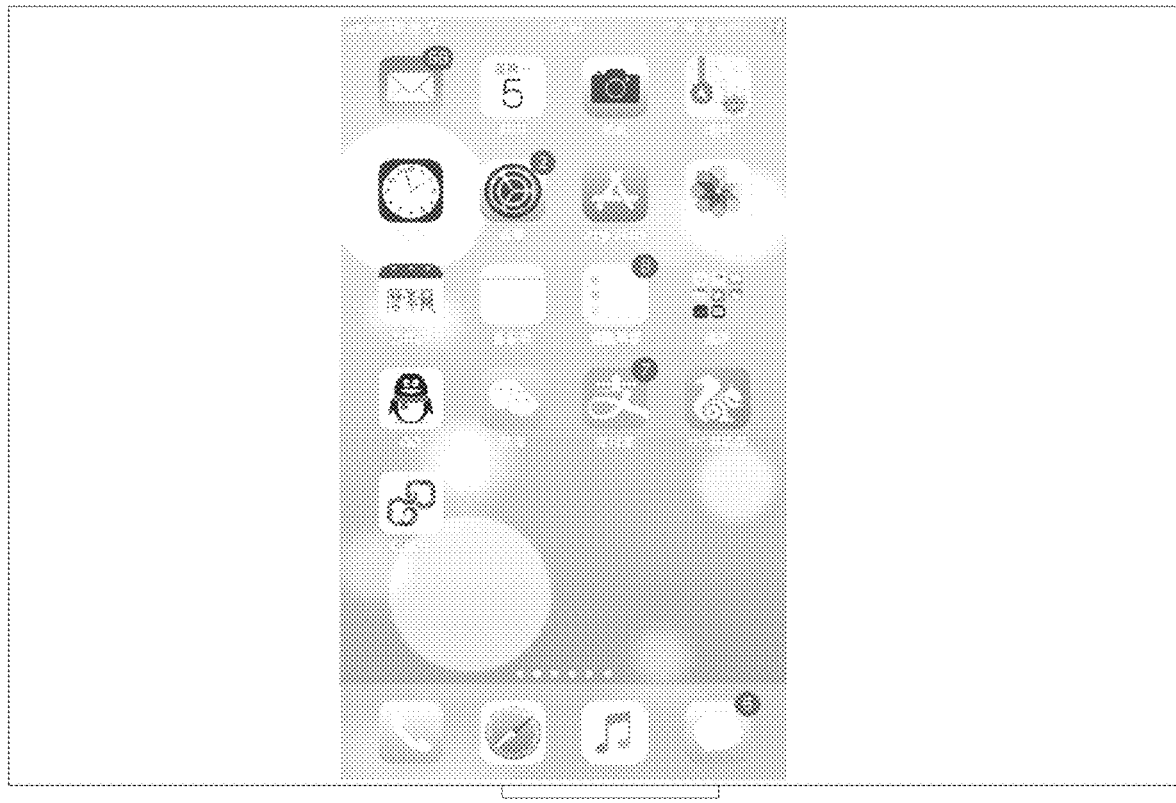
FIG. 13B is a second schematic diagram illustrating a scenario of mirroring screen according to an example of the present disclosure.

In an example, for the above block 403, after the receiver device establishes a mirror connection with the transmitter device, the receiver device and the transmitter device will perform coordination in device function and network condition so that appropriate video and audio transmission formats are selected for the receiver device. After an online session of video and audio streams is established, the receiver device may synchronously display the contents of the screen of the transmitter device. The screen of the transmitter device is as shown in FIG. 13A, and the screen of the receiver device is as shown in FIG. 13B.

Further, the receiver device may also control play and pause of video and audio synchronously displayed on the receiver device according to a control signaling sent by the transmitter device.

Figure 14:
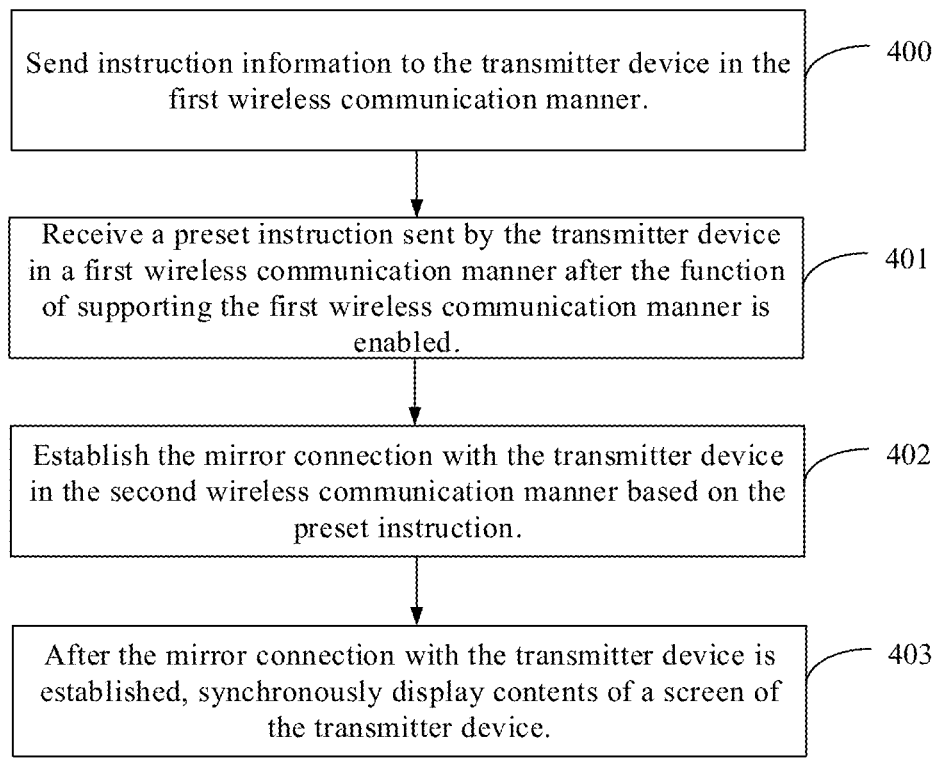
FIG. 14 is a flowchart illustrating another method of mirroring screen according to an example of the present disclosure.

In an example, FIG. 14 is a flowchart illustrating another method of mirroring screen based on the example of FIG. 10. As shown in FIG. 14, before block 401, the method further includes the following block.

At block 400, instruction information is sent to the transmitter device in the first wireless communication manner.

The receiver device may determine whether the receiver device itself supports the second wireless communication manner in advance, for example, whether the Miracast communication manner is supported. At this block, the receiver device may notify the transmitter device of whether the receiver device itself supports the second wireless communication manner through the instruction information, so that the transmitter device determines the target receiver device in the receiver devices supporting the second wireless communication manner.

In the above example, before receiving the preset instruction from the transmitter device in the first wireless communication manner, the receiver device may send the instruction information to the transmitter device in the first wireless communication manner to notify the transmitter device of whether the receiver device supports the second wireless communication manner through the instruction information. In this way, it is ensured that the transmitter device accurately determines the second candidate receiver device from the first candidate receiver devices, thereby simplifying the implementation and increasing availability.

In an example, optionally, the first wireless communication manner is a Bluetooth communication manner and the second wireless communication manner is a wireless communication manner, for example, a Miracast manner, in which the transmitter device is taken as a hotspot to perform wireless communication with the receiver device.

In the above examples, the transmitter device may control the receiver device to switch to the Miracast screen mirroring manner in the Bluetooth communication manner. In this way, a user is not required to manually enable the Miracast function nor put the transmitter device and the receiver device in the same local area network, thereby simplifying user operation, improving user experiences and increasing availability of the screen mirroring manner.

Figure 15:
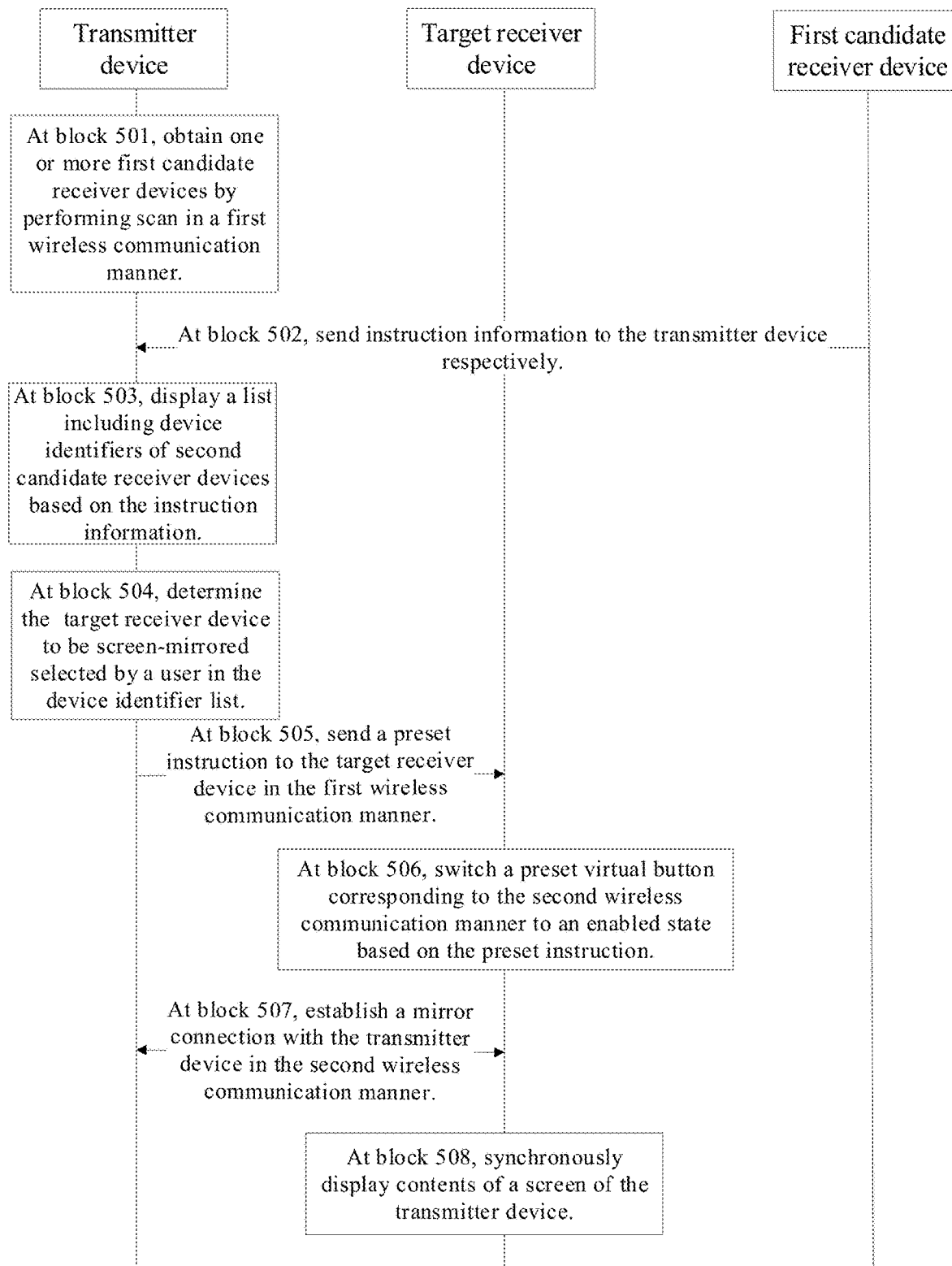
FIG. 15 is a flowchart illustrating another method of mirroring screen according to an example of the present disclosure.

FIG. 15 is a flowchart illustrating another method of mirroring screen according to an example of the present disclosure. As shown in FIG. 15, in an example, the method includes the following blocks.

At block 501, a transmitter device obtains one or more first candidate receiver devices by performing scan in a first wireless communication manner.

At block 502, the one or more first candidate receiver device sends instruction information to the transmitter device respectively.

The instruction information is used to indicate whether the corresponding first candidate receiver device supports a second wireless communication manner.

At block 503, the transmitter device displays a list including device identifiers of one or more second candidate receiver devices based on the instruction information.

The second candidate receiver devices are the first candidate receiver devices supporting the second wireless communication manner as indicated by the instruction information.

At block 504, the transmitter device determines the target receiver device to be screen-mirrored selected by a user in the device identifier list.

At block 505, the transmitter device sends a preset instruction to the target receiver device in the first wireless communication manner.

At block 506, the target receiver device switches a preset virtual button corresponding to the second wireless communication manner to an enabled state based on the preset instruction.

At block 507, the target receiver device establishes a mirror connection with the transmitter device in the second wireless communication manner.

At block 508, the target receiver device synchronously displays contents of a screen of the transmitter device.

Optionally, the first wireless communication manner is a Bluetooth communication manner and the second wireless communication manner is a wireless communication manner in which the transmitter device is taken as a hotspot to perform wireless communication with the receiver device.

In this way, a user is not required to manually enable the second wireless communication function nor put the transmitter device and the receiver device in the same local area network, thereby simplifying user operation, improving user experiences and increasing availability of the screen mirroring manner at the same time.

For convenience of descriptions, the above method examples are expressed as a series of action combinations. However, those skilled in the prior art shall know that the present disclosure is not limited to the described action sequence because some blocks may be performed in another sequence or at the same time according to the present disclosure. Further, those skilled in the prior art should know that the examples described herein are optional examples and the actions and modules involved are not necessarily required in the present disclosure.

Corresponding to the above examples of method of mirroring screen, the present disclosure further provides an apparatus for mirroring screen and corresponding examples.

Figure 16:
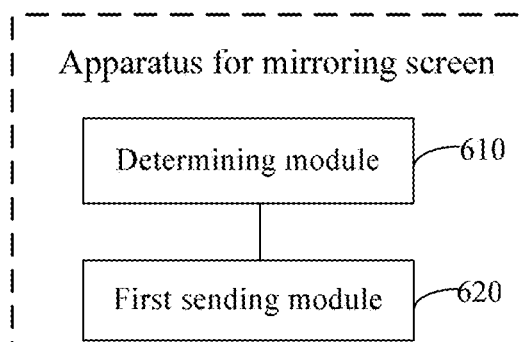
FIG. 16 is a block diagram illustrating an apparatus for mirroring screen according to an example of the present disclosure.

FIG. 16 is a block diagram illustrating an apparatus for mirroring screen according to an example of the present disclosure. As shown in FIG. 16, the apparatus may be applied to a transmitter device and include:

a determining module 610, configured to determine a target receiver device to be screen-mirrored, where the target receiver device is a screen-mirrorable device supporting a second wireless communication manner; and a first sending module 620, configured to send a preset instruction to the target receiver device in a first wireless communication manner, where the preset instruction is used to instruct the target receiver device to establish a mirror connection with the transmitter device in the second wireless communication manner.

Figure 17:
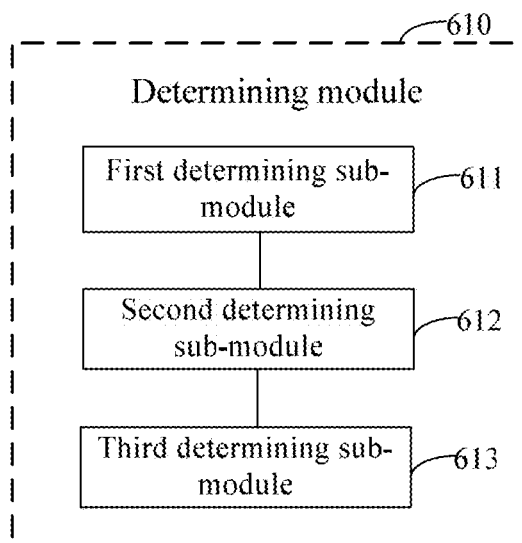
FIG. 17 is a block diagram illustrating another apparatus for mirroring screen according to an example of the present disclosure.

FIG. 17 is a block diagram illustrating another method of mirroring screen based on the example of FIG. 16. As shown in FIG. 17, the determining module 610 includes:

a first determining sub-module 611, configured to obtain one or more first candidate receiver devices by performing scan in the first wireless communication manner, where the first candidate receiver devices are a screen-mirrorable devices enabling the function of supporting the first wireless communication manner;

a second determining sub-module 612, configured to determine one or more second candidate receiver devices supporting the second wireless communication manner in the one or more first candidate receiver devices; and a third determining sub-module, configured to determine the target receiver device to be screen-mirrored in the second candidate receiver devices.

Figure 18A:
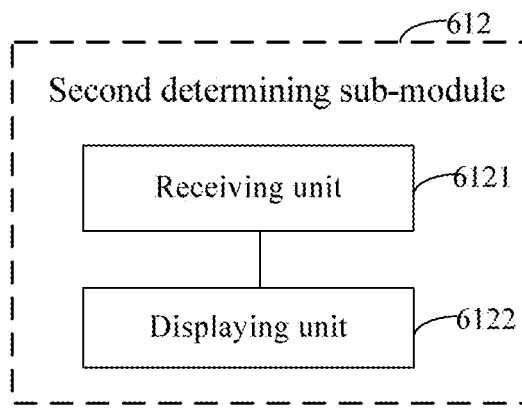
FIG. 18A is a first block diagram illustrating an apparatus for mirroring screen according to an example of the present disclosure.

FIG. 18A is a block diagram illustrating another apparatus for mirroring screen based on the example of FIG. 16. As shown in FIG. 18A, the second determining sub-module 612 includes:

a receiving unit 6121, configured to receive instruction information sent by the one or more first candidate receiver devices in the first wireless communication manner respectively, where the instruction information is used to indicate whether the corresponding first candidate receiver device supports the second wireless communication manner; and a displaying unit 6122, configured to display a list including device identifiers of the second candidate receiver devices based on the instruction information.

Figure 18B:
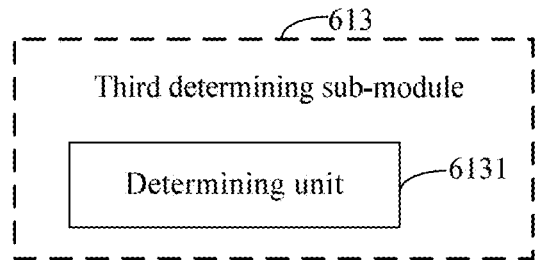
FIG. 18B is a second block diagram illustrating an apparatus for mirroring screen according to an example of the present disclosure.

FIG. 18B is a block diagram illustrating another apparatus for mirroring screen based on the example of FIG. 16. As shown in FIG. 18B, the third determining sub-module 613 includes:

a determining unit 6131, configured to determine the target receiver device to be screen-mirrored selected by a user in the list including device identifiers of the second candidate receiver devices.

Optionally, the first wireless communication manner is a Bluetooth communication manner and the second wireless communication manner is a wireless communication manner in which the transmitter device is taken as a hotspot to perform wireless communication with the receiver device.

Figure 19:
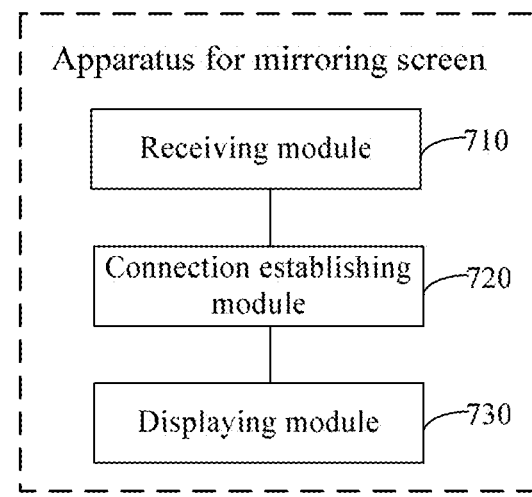
FIG. 19 is a block diagram illustrating another apparatus for mirroring screen according to an example of the present disclosure.

FIG. 19 is a block diagram illustrating an apparatus for mirroring screen according to an example of the present disclosure. As shown in FIG. 19, the apparatus may be applied to a receiver device and include:

a receiving module 710, configured to receive a preset instruction sent by a transmitter device in a first wireless communication manner;

a connection establishing module 720, configured to establish a mirror connection with the transmitter device in a second wireless communication manner based on the preset instruction; and a displaying module 730, configured to synchronously display contents of a screen of the transmitter device after the mirror connection with the transmitter device is established.

Figure 20:
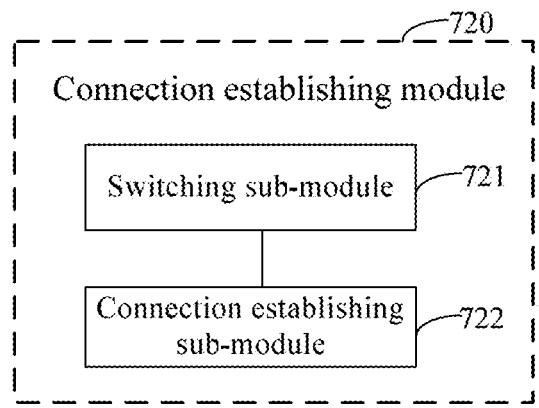
FIG. 20 is a block diagram illustrating another apparatus for mirroring screen according to an example of the present disclosure.

FIG. 20 is a block diagram illustrating another apparatus for mirroring screen based on the example of FIG. 19. As shown in FIG. 20, the connection establishing module 720 includes:

a switching sub-module 721, configured to switch a preset virtual button corresponding to the second wireless communication manner to an enabled state based on the preset instruction; and A connection establishing sub-module 722, configured to establish a mirror connection with the transmitter device in the second wireless communication manner.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Figure 21:
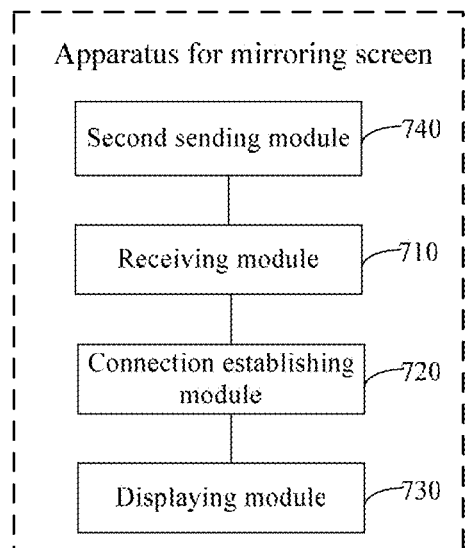
FIG. 21 is a block diagram illustrating another apparatus for mirroring screen according to an example of the present disclosure.

FIG. 21 is a block diagram illustrating another apparatus for mirroring screen based on the example of FIG. 19. As shown in FIG. 21, the apparatus further includes:

a second sending module 740, configured to send instruction information to the transmitter device in the first wireless communication manner, where the instruction information is used to indicate whether the receiver device itself supports the second wireless communication manner.

Optionally, the first wireless communication manner is a Bluetooth communication manner and the second wireless communication manner is a wireless communication manner in which the transmitter device is taken as a hotspot to perform wireless communication with the receiver device.

Since the apparatus examples substantially correspond to the method examples, a reference may be made to part of the descriptions of the method embodiments for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

Correspondingly, an example of the present disclosure further provides a computer readable storage medium storing computer program. The computer programs are configured to perform any above method of mirroring screen applied to the transmitter device side.

Correspondingly, an example of the present disclosure further provides a computer readable storage medium storing computer program. The computer programs are configured to perform any above method of mirroring screen applied to the receiver device side.

Correspondingly, an example of the present disclosure further provides an apparatus for mirroring screen. The apparatus may be applied to a transmitter device and include:

a processor; and a memory storing processor-executable instructions.

The processor is configured to:

determine a target receiver device to be screen-mirrored, where the target receiver device is a screen-mirrorable device supporting a second wireless communication manner; and send a preset instruction to the target receiver device in a first wireless communication manner, where the preset instruction is used to instruct the target receiver device to establish a mirror connection with the transmitter device in the second wireless communication manner.

Figure 22:
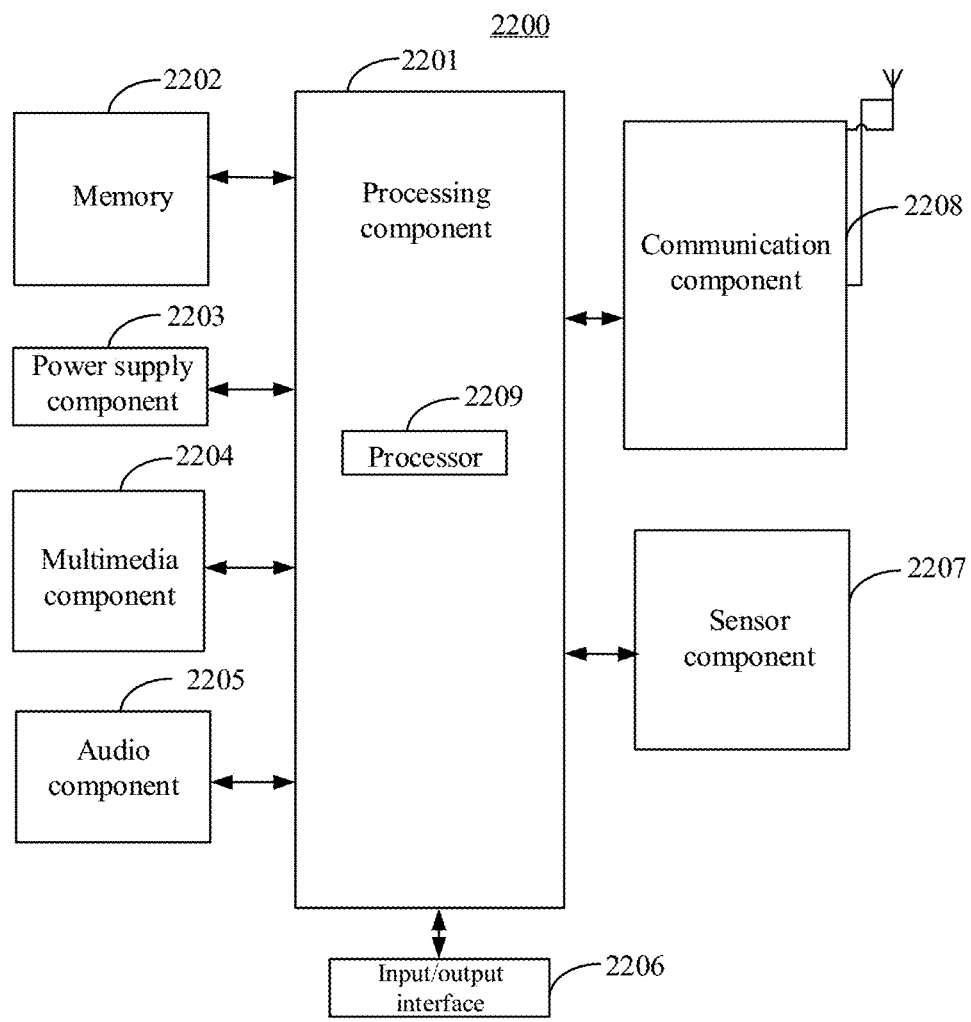
FIG. 22 is a schematic diagram illustrating a structure of an apparatus for mirroring screen according to an example of the present disclosure.

FIG. 22 is a schematic diagram illustrating a structure of an apparatus for mirroring screen according to an example of the present disclosure. As shown in FIG. 22, the apparatus 2200 for mirroring screen according to an example may be a transmitter device such as a computer, a mobile phone, a digital broadcast terminal, a message transceiver, a tablet device, and a personal digital assistant.

As shown in FIG. 22, the apparatus 2200 may include one or more of a processing component 2201, a memory 2202, a power supply component 2203, a multimedia component 2204, an audio component 2205, an input/output (I/O) interface 2206, a sensor component 2207 and a communication component 2208.

The processing component 2201 generally controls the overall operation of the apparatus 2200, such as operations associated with display, phone call, data communication, camera operation, and recording operations. The processing component 2201 may include one or more processors 2209 to execute instructions to complete all or a part of the blocks of the above method. In addition, the processing component 2201 may include one or more modules to facilitate the interaction between the processing component 2201 and other components. For example, the processing component 2201 may include a multimedia module to facilitate the interaction between the multimedia component 2204 and the processing component 2201.

The memory 2202 is configured to store different types of data to support operation at the apparatus 2200. Examples of such data include instructions for any application or method that operates on the apparatus 2200, contact data, phonebook data, messages, pictures, videos, and so on. The memory 2202 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 2203 may provide power for different components of the apparatus 2200. The power supply component 2203 may include a power supply management system, one or more power sources, and other components associated with generating, managing and distributing power for the apparatus 2200.

The multimedia component 2204 includes a screen providing an output interface between the apparatus 2200 and a user. In some examples, the screen may include a Liquid Crystal Display (LCD) and/or a Touch Panel (TP). In some embodiments, an organic light-emitting diode (OLED) display or other types of displays can be adopted.

If the screen includes a touch panel, the screen may be implemented as a touch screen to receive an input signal from a user. The touch panel includes one or more touch sensors to sense touch, slide and gestures on the touch panel. The touch sensor may not only sense the boundary of a touch or slide operation but also detect duration and pressure relating to the touch or slide operation. In some examples, the multimedia component 2204 may include a front-facing camera and/or a rear camera. When the apparatus 2200 is in an operating mode, such as in a shooting mode or a video mode, the front-facing camera and/or the rear camera may receive external multimedia data. Each of the front-facing camera and the rear camera may be a fixed optical lens system or may be capable of focal length and optical zoom.

The audio component 2205 is configured to output and/or input an audio signal. For example, the audio component 2205 includes a microphone (MIC). When the apparatus 2200 is in an operating mode, for example, in a call mode, a recording mode or a speech recognition mode, the microphone is configured to receive an external audio signal. The received audio signal may be further stored in the memory 2202 or sent via the communication component 2208. In some examples, the audio component 2205 also includes a speaker for outputting an audio signal.

The I/O interface 2206 provides an interface between the processing component 2201 and a peripheral interface module. The peripheral interface module may be a keyboard, click wheel, a button and the like. Such buttons may include but not limited to: a home button, a volume button, a start button and a lock button.

The sensor component 2207 includes one or more sensors for evaluating states of the apparatus 2200 in different aspects. For example, the sensor component 2207 may detect the on/off state of the apparatus 2200, and relative locations of units, for example, the component is a display and a keypad of the apparatus 2200. The sensor component 2207 may also detect a position change of the apparatus 2200 or one component of the apparatus 2200, the presence or absence of contact of a user with the apparatus 2200, an orientation or acceleration/deceleration of the apparatus 2200 and a temperature change of the apparatus 2200. The sensor component 2207 may include a proximity sensor configured to detect presence of a nearby object without any physical contact. The sensor component 2207 may also include an optical sensor, such as a CMOS or CCD image sensor to be used in imaging application. In some examples, the sensor component 2207 may also include an acceleration sensor, a gyroscope sensor, a magnetic sensor, a pressure sensor, or a temperature sensor.

The communication component 2208 is configured to facilitate wired or wireless communication between the apparatus 2200 and other devices. The apparatus 2200 may access a wireless network based on a communication standard, such as WIFI, 2G, 3G, 4G or 5G or a combination thereof. In an example, the communication component 2208 may receive a broadcast signal or broadcast-related information from an external broadcast management system via a broadcast channel. In an example, the communication component 2208 may also include a Near Field Communication (NFC) module to facilitate short-range communications. For example, the NFC module may be implemented based on Radio Frequency Identification (RFID) technology, Infrared Data Association (IrDA) technology, Ultra-Wide Band (UWB) technology, Bluetooth (BT) technology and other technology.

In an example, the apparatus 2200 may be implemented by one or more of an Application-Specific Integrated Circuit (ASIC), a Digital Signal Processor (DSP), a Digital Signal Processing Device (DSPD), a Programmable Logical Device (PLD), a Field Programmable Gate Array (FPGA), a controller, a microcontroller, a microprocessor or other electronic elements to perform the above method.

In an example, there is further provided a non-transitory computer readable storage medium including instructions, for example, the memory 2202 including instructions. The above instructions may be executed by the processor 2209 of the apparatus 2200 to complete the above method. For example, the non-transitory computer readable storage medium may be a Read Only Memory (ROM), a Random-Access Memory (RAM), a CD-ROM, a magnetic tape, a floppy disk, and optical data storage device and the like.

When the instructions in the storage medium are executed by the processor, the apparatus 2200 is caused to perform the above method of mirroring screen.

Correspondingly, an example of the present disclosure further provides another apparatus for mirroring screen. The apparatus may be applied to a receiver device and include:
 a processor; and
 a memory storing processor-executable instructions.
 The processor is configured to:
 receive a preset instruction sent by a transmitter device in a first wireless communication manner;
 establish a mirror connection with the transmitter device in a second wireless communication manner based on the preset instruction; and
 synchronously display contents of a screen of the transmitter device after the mirror connection with the transmitter device is established.

Figure 23:
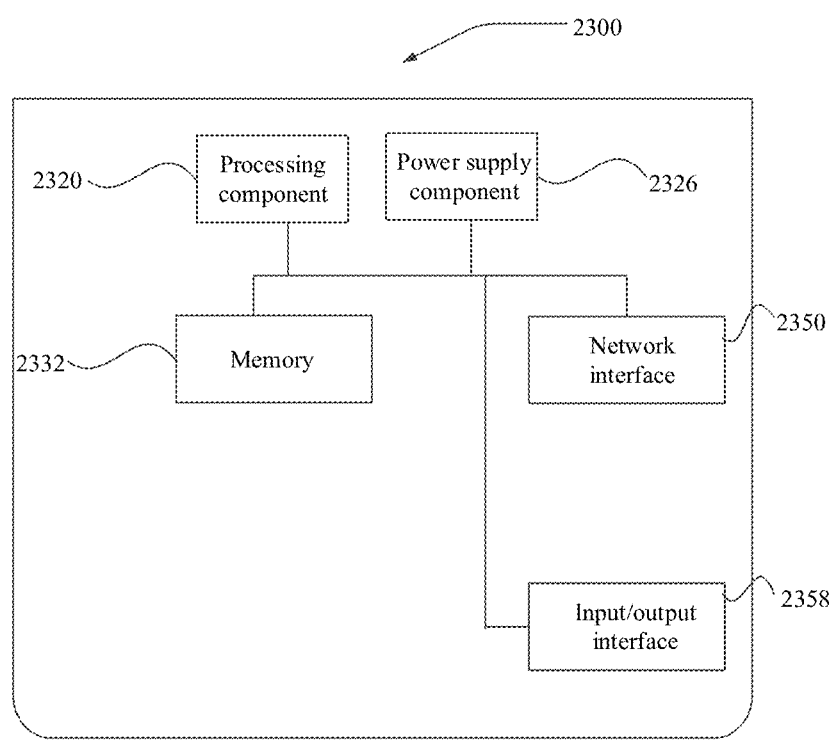
FIG. 23 is a schematic diagram illustrating another structure of an apparatus for mirroring screen according to an example of the present disclosure.

FIG. 23 is a schematic diagram illustrating a structure of an apparatus 2300 for mirroring screen according to an example of the present disclosure. For example, the apparatus 2300 may include a receiver device such as a TV. As shown in FIG. 23, the apparatus 2300 includes a processing component 2320 which further includes one or more processors and memory resources represented by a memory 2332 for storing instructions, for example, application programs, executable by the processing component 2320. The application programs stored in the memory 2332 may include one or more modules, each of which corresponds to one group of instructions. Further, the processing component 2320 is configured to execute instructions to perform the above method of mirroring screen.

The apparatus 2300 may further include a power supply component 2326 configured to perform power management of the apparatus 2300, a wired or wireless network interface 2350 configured to connect the apparatus 2300 with a network and an Input and Output (I/O) interface 2358. The apparatus 2300 may operate an operating system stored in the memory 2332, such as Android, IOS, Windows Server™, Mac OS X™, Unix™, Linux™, FreeBSD™ or the like.

When the instructions in the memory 2332 are executed by the processing component 2320, the apparatus 2300 is caused to perform the above method of mirroring screen.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of mirroring screen, the method being applicable to a receiver device and comprising:
   receiving a preset instruction sent by a transmitter device in a first wireless communication manner;
   switching a preset virtual button of the receiver device to enable a second wireless communication manner based on the preset instruction;
   establishing a mirror connection with the transmitter device in the second wireless communication manner; and
   synchronously displaying contents of a screen of the transmitter device after the mirror connection with the transmitter device is established,
   wherein the switching and establishing are realized without user manually enabling the second wireless communication on the receiver device and without the user manually putting the transmitter device and the receiver device in a same local area network.

2. The method according to claim 1, wherein before the preset instruction sent by the transmitter device in the first wireless communication manner is received, the method further comprises:
   sending instruction information to the transmitter device in the first wireless communication manner, wherein the instruction information is configured to indicate whether the receiver device supports the second wireless communication manner.

3. The method according to claim 1, wherein the first wireless communication manner is a Bluetooth communication manner and the second wireless communication manner is a wireless communication manner in which the transmitter device is taken as a hotspot to perform wireless communication with the receiver device.

4. The method according to claim 3, wherein the second wireless communication manner is a Miracast communication manner.

5. A display system implementing the method according to claim 1, comprising the transmitter device and the receiver device, wherein the system is configured to mirror the screen from the transmitter device to the receiver device without user manually enabling the second wireless communication function on the receiver device and without the user manually putting the transmitter device and the receiver device in a same local area network.

6. An apparatus for mirroring screen, the apparatus being applicable to a receiver device and comprising:
   a processor, and
   a memory storing processor-executable instructions;
   wherein the processor is configured to:
   receive a preset instruction sent by a transmitter device in a first wireless communication manner;
   switch a preset virtual button of the receiver device to enable a second wireless communication manner based on the preset instruction;
   establish a mirror connection with the transmitter device in the second wireless communication manner; and
   synchronously display contents of a screen of the transmitter device after the mirror connection with the transmitter device is established,
   wherein the switching and establishing are realized without user manually enabling the second wireless communication on the receiver device and without the user manually putting the transmitter device and the receiver in a same local area network.

7. The apparatus according to claim 6, wherein
   the processor is configured to perform the switching and establishing without user manually enabling the second wireless communication on the receiver device and without the user manually putting the transmitter device and the receiver device in a same local area network.

8. The apparatus according to claim 6, wherein before receiving the preset instruction sent by the transmitter device in the first wireless communication manner, the processor is caused to:
   send instruction information to the transmitter device in the first wireless communication manner, wherein the instruction information is used to indicate whether the receiver device supports the second wireless communication manner.

9. The apparatus according to claim 6, wherein the first wireless communication manner is a Bluetooth communication manner and the second wireless communication manner is a wireless communication manner in which the transmitter device is taken as a hotspot to perform wireless communication with the receiver device.

10. The apparatus according to claim 9, wherein the second wireless communication manner is a Miracast communication manner.

11. A non-transitory computer-readable storage medium, wherein the storage medium stores computer programs, wherein the computer programs, when executed by a processing circuit, cause the processing circuit to:
    receive a preset instruction sent by a transmitter device in a first wireless communication manner;
    switch a preset virtual button of the receiver device to enable a second wireless communication manner based on the preset instruction;
    establish a mirror connection with the transmitter device in the second wireless communication manner; and
    synchronously display contents of a screen of the transmitter device after the mirror connection with the transmitter device is established,
    wherein the switching and establishing are realized without user manually enabling the second wireless communication on the receiver device and without the user manually putting the transmitter device and the receiver in a same local area network.

12. The non-transitory computer-readable storage medium according to claim 11, wherein
    the processing circuit is further configured to perform the switching and establishing without user manually enabling the second wireless communication on the receiver device and without the user manually putting the transmitter device and the receiver device in a same local area network.

13. The non-transitory computer-readable storage medium according to claim 11, wherein before receiving the preset instruction sent by the transmitter device in the first wireless communication manner, the processing circuit is caused to:

send instruction information to the transmitter device in the first wireless communication manner, wherein the instruction information is used to indicate whether the receiver device supports the second wireless communication manner.

14. The non-transitory computer-readable storage medium according to claim 11, wherein the first wireless communication manner is a Bluetooth communication manner and the second wireless communication manner is a wireless communication manner in which the transmitter device is taken as a hotspot to perform wireless communication with the receiver device.

15. The non-transitory computer-readable storage medium according to claim 14, wherein the second wireless communication manner is a Miracast communication manner.

\* \* \* \* \*